F. L. WRIGHT.
LOWER LOOP RETAINER FOR MOTION PICTURE PROJECTING APPARATUS.
APPLICATION FILED APR. 17, 1915.
1,152,384.
Patented Aug. 31, 1915.
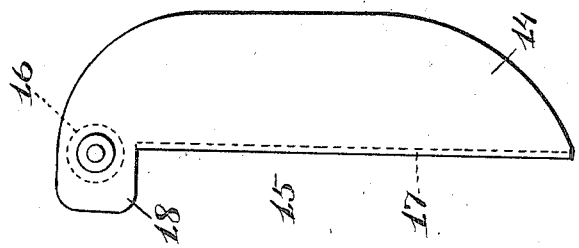
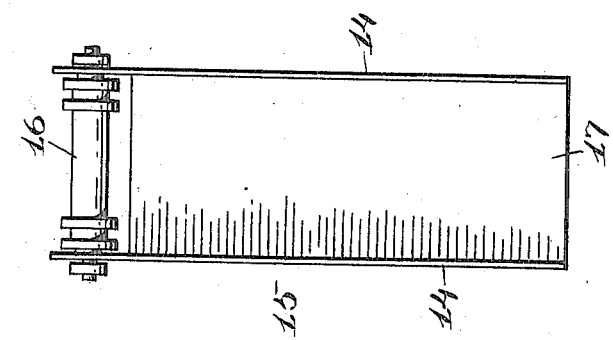
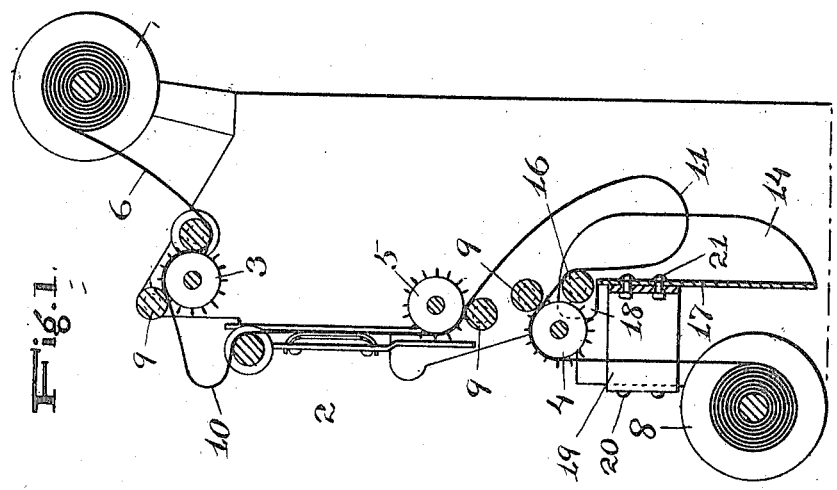

UNITED STATES PATENT OFFICE.

FORD L. WRIGHT, OF ANTHONY, KANSAS.

LOWER-LOOP RETAINER FOR MOTION-PICTURE-PROJECTING APPARATUS.

1,152,384.  Specification of Letters Patent.  Patented Aug. 31, 1915.

Application filed April 17, 1915. Serial No. 22,109.

*To all whom it may concern:*

Be it known that I, FORD L. WRIGHT, a citizen of the United States, resident of Anthony, in the county of Harper and State of Kansas, have made a certain new and useful Invention in Lower-Loop Retainers for Motion-Picture-Projecting Apparatus; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central vertical section of the invention, as applied. Fig. 2 is a detail rear view of the invention. Fig. 3 is a detail side view of the same.

The invention has relation to means for use with motion picture projecting apparatus, to insure the retention of the lower loop of the film in correct engagement with the lower sprocket wheel.

The invention consists in the novel construction and combinations of parts, as hereinafter set forth.

In the accompanying drawings, illustrating the invention, the numeral 2 designates a motion picture projecting apparatus, wherein 3 is the upper continuously driven sprocket wheel, 4 the lower continuously driven sprocket wheel, 5 the intermittently driven sprocket wheel below the projection aperture, the three sprocket wheels engaging the marginal apertures of the film 6 in the usual manner. The upper reel from which the film is fed is indicated at 7, and the lower or receiving reel at 8. Each of the sprocket wheels is usually provided with an idler 9, to press the film in engagement therewith.

In motion picture projecting apparatus it is usual to provide an upper loop 10 in the film, between the upper sprocket and the projection aperture, and a lower loop 11, between the two lower sprockets, the purpose of these loops being well understood, and it is the object of the present invention to provide means engaging this lower film loop to retain it in proper position, so that any tendency of the film to become disengaged from the lower sprocket will be minimized or avoided, such disengagement sometimes happening, at present, and causing annoying delays in the exhibition and frequently damaging the film. To this end, a means is provided having parallel side flanges 14, 14, located adjacent to the lower continuously driven sprocket, and in close relation to the lateral edges of the lower film loop as it approaches said sprocket wheel, said flanges acting to guide the part of the film included in said loop to the sprocket wheel, and, in case of vibration of the machine, or draft of air, or anything that would cause a disturbance of this lower loop of the film, the lateral guide flanges would immediately act to prevent any such disturbance and to hold the film exactly.

In the preferred form of the invention, the lateral guide flanges 14, 14 form a part of a member 15, carried by a suitable attachment frame and providing bearings for the shaft of an idler roller 16, located adjacent to the lower sprocket, said member having a transverse portion or wall 17 connecting the flanges, and the flanges having parallel extensions or lugs 18, having close relation to the end walls of the lower sprocket, to center the guide flanges to said sprocket.

The member 15 is supported in position by different means, according to the type of machine. In the drawings a frame piece 19 is bolted to the main frame at 20, and the member 15 is bolted to the frame piece at 21.

What I claim is:

1. A lower film-loop retainer for motion picture projecting apparatus having a lower continuously driven sprocket wheel, including lateral guide flanges located adjacent to said sprocket wheel and in close relation to the edges of the film-loop.

2. A lower film-loop retainer for motion picture projecting apparatus having a lower continuously driven sprocket wheel, including an idler for said sprocket wheel and a member having lateral guide flanges in close relation to the lateral edges of the lower film-loop.

3. A lower film-loop retainer for motion picture projecting apparatus having a lower continuously driven sprocket wheel, including an idler for said sprocket wheel and a member having lateral guide flanges in close relation to the lateral edges of the lower film-loop, and centering lugs in close relation to the ends of said wheel.

In testimony whereof I affix my signature, in presence of two witnesses.

FORD L. WRIGHT.

Witnesses:
E. C. WILCOX,
MYRTLE YOUNGBERG.